United States Patent
Yamanaka

(10) Patent No.: US 8,721,187 B2
(45) Date of Patent: May 13, 2014

(54) BICYCLE AXLE ASSEMBLY

(75) Inventor: Masahiro Yamanaka, Osaka (JP)

(73) Assignee: Shimano Inc., Osaka (JP)

( * ) Notice: Subject to any disclaimer, the term of this patent is extended or adjusted under 35 U.S.C. 154(b) by 1839 days.

(21) Appl. No.: 11/697,331

(22) Filed: Apr. 6, 2007

(65) Prior Publication Data

US 2008/0247695 A1 Oct. 9, 2008

(51) Int. Cl.
 *F16C 9/00* (2006.01)
(52) U.S. Cl.
 USPC .......................................................... 384/458
(58) Field of Classification Search
 USPC .............. 74/594.1, 594.2; 384/537, 538, 540, 384/543, 545, 458
 See application file for complete search history.

(56) References Cited

U.S. PATENT DOCUMENTS

| | | | |
|---|---|---|---|
| 1,811,679 A * | 6/1931 | Volet | 384/538 |
| 4,331,043 A | 5/1982 | Shimano | |
| 4,576,503 A * | 3/1986 | Orain | 403/259 |
| 5,209,581 A * | 5/1993 | Nagano | 384/545 |
| 5,493,937 A * | 2/1996 | Edwards | 74/594.1 |
| 5,549,396 A | 8/1996 | Chiang | |
| 5,572,909 A * | 11/1996 | Chi | 74/594.1 |
| 5,984,528 A * | 11/1999 | Ohtsu | 384/545 |
| 5,997,104 A | 12/1999 | Campagnolo | |
| 6,212,774 B1 | 4/2001 | Ohtsu | |
| 6,244,750 B1 | 6/2001 | Chiang | |
| 6,581,494 B2 | 6/2003 | Sechler | |
| 6,883,818 B1 * | 4/2005 | Chiang | 280/279 |
| 6,983,672 B2 * | 1/2006 | Smith | 74/594.1 |
| 7,186,030 B2 * | 3/2007 | Schlanger | 384/545 |
| 2003/0097900 A1 | 5/2003 | Yamanaka | |
| 2005/0072264 A1 * | 4/2005 | Yamanaka | 74/594.1 |
| 2006/0112780 A1 | 6/2006 | Shiraishi et al. | |

FOREIGN PATENT DOCUMENTS

| | | |
|---|---|---|
| DE | 10-200-0272-520 A1 | 12/2006 |
| DE | 20-2006-013-656 U1 | 12/2006 |
| DE | 203 21 297 U1 | 12/2006 |
| EP | 1314902 A1 | 5/2003 |
| GB | 2325712 A | 12/1998 |

* cited by examiner

*Primary Examiner* — Alan B Waits
(74) *Attorney, Agent, or Firm* — Global IP Counselors

(57) ABSTRACT

A bicycle axle assembly is provided with an axle including a rotational axis, a bearing, a bearing adapter and a conical element. The bearing includes a cone disposed on the axle, a cup and a plurality of roller elements disposed between the cone and the cup such that the cup rotates relative to the cone about the rotational axis. The bearing adapter includes a tubular mounting section for mounting to a tubular member and a bearing housing section housing the bearing therein. The bearing housing section has a tapered abutment angled relative to the rotational axis at a first abutment angle and contacting a tapered contact surface of the cup. The conical element is disposed on the axle. The conical element has a tapered abutment angled relative to the rotational axis at a second abutment angle and contacting a tapered contact surface of the first cone. The second abutment angle of the tapered abutment of the conical element is smaller than the first abutment angle of the bearing housing section.

11 Claims, 6 Drawing Sheets

BICYCLE AXLE ASSEMBLY

BACKGROUND OF THE INVENTION

1. Field of the Invention

This invention generally relates to a bicycle axle assembly for a bicycle component. More specifically, the present invention relates to a bicycle axle assembly that is especially useful in a crank axle assembly.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Generally speaking, a conventional bicycle has a pair of wheels mounted to a diamond-shaped main frame formed of a plurality of tubes and a front fork pivotally connected to the main frame. The tubes of the main frame typically include a top tube, a down tube, a head tube, a seat tube, a pair of seat stays, a pair of chain stays and a cylindrical or tubular hanger part. The tubes of the main frame are fixedly coupled together to form a front triangularly shaped part and a rear triangularly shaped part that is arranged rearward of the front triangularly shaped part. The front and rear triangularly shaped parts serve as the framework of the bicycle body with a rear wheel mounted to the rear triangularly shaped part by a rear axle. The front fork is pivotally supported on the front triangularly shaped part such that the front fork can rotate freely about an axis that is tilted slightly from vertical. The front fork has a front wheel coupled thereto by a front axle.

The cylindrical or tubular hanger part of the frame is often called a bicycle bottom bracket hanger because it supports a bottom bracket. Many different types of bottom bracket are currently available on the market. Generally speaking, a conventional bicycle bottom bracket has a pair of bearings mounted into a tubular hanger part of a bicycle frame for rotatably supporting a crank axle. One type of conventional crank axle assembly is disclosed in U.S. Pat. No. 6,983,672. This conventional crank axle assembly is equipped with first and second axle support members that have first and second bearings, respectively. The first and second axle support members are screwed in to both end portions of the hanger part separately. The crank axle is rotatably supported on both of the first and second bearings, and right and left cranks are non-rotatably mounted on the both axial end portions of the crank axle.

Examples of other types of conventional crank axle assemblies with cup/cone bearings are disclosed in U.S. Pat. Nos. 4,331,043, 5,549,396, and 6,581,494. In each of these examples, the first and second bearings are mounted within the tubular hanger part. Thus, the size of the bearings is limited by the size of the internal diameter of the tubular hanger part. An example of a crank axle assembly that has the bearings located outside of the tubular hanger part is disclosed in U.S. Patent Application Publication No. 2006/0112780. However, theses bearings are industrial bearings as opposed to cup/cone bearings.

In view of the above, it will be apparent to those skilled in the art from this disclosure that there exists a need for an improved bicycle bottom bracket hanger. This invention addresses this need in the art as well as other needs, which will become apparent to those skilled in the art from this disclosure.

SUMMARY OF THE INVENTION

One object of the present invention is to provide a bicycle axle assembly that uses cup/cone bearings that are larger than the internal diameter of the hanger part of the frame.

The foregoing object can basically be attained by providing a bicycle axle assembly that basically comprises an axle, a first bearing, a first bearing adapter, and a first conical element. The axle includes a rotational axis. The first bearing includes a first cone disposed on the axle, a first cup and a plurality of first roller elements disposed between the first cone and the first cup such that the first cup rotates relative to the first cone about the rotational axis. The first bearing adapter includes a first tubular mounting section for mounting to a tubular member and a first bearing housing section housing the first bearing therein. The first bearing housing section has a first tapered abutment angled relative to the rotational axis at a first abutment angle and contacting a first tapered contact surface of the first cup. The first conical element disposed on the axle. The first conical element has an tapered abutment angled relative to the rotational axis at a second abutment angle and contacting a first tapered contact surface of the first cone. The second abutment angle of the tapered abutment of the first conical element is smaller than the first abutment angle of the first bearing housing section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
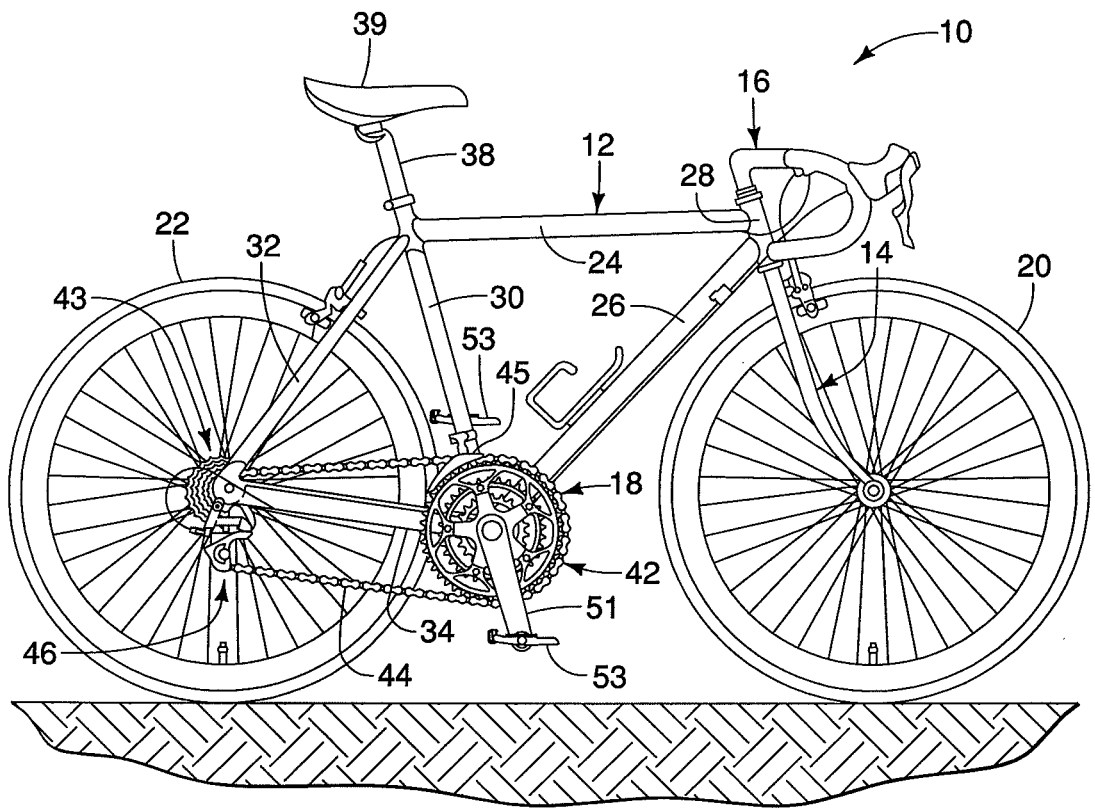
FIG. 1 is an overall right side elevational view of a bicycle frame equipped with a bicycle axle assembly in accordance with one embodiment of the present invention.

Referring initially to FIG. 1, a bicycle 10 is illustrated that incorporates one embodiment of the present invention. In this example, the bicycle 10 is a road bike that has a diamond-shaped bicycle frame 12 with a triangularly shaped front triangle and a triangularly shaped rear triangle that is arranged rearward of the front triangle. The bicycle frame 12 serves as the framework of the bicycle body. The bicycle frame 12 has a front fork 14 pivotally supported on a front part of the bicycle frame 12 such that the front fork 14 can rotate freely about an axis that is tilted slightly from vertical. The lower or bottom part of the front fork 14 is divided into two prongs. The bicycle 10 is also provided with a drop-type handlebar unit 16 connected to the front fork 14, and a drive unit 18 provided on a lower part of the bicycle frame 12. The drive unit 18 is configured to convert pedaling force into driving force. A front wheel 20 is supported in a freely rotatable manner on the bottom end of the front fork 14, while a rear wheel 22 is supported in a freely rotatable manner on a rear part of the bicycle frame 12. Of course, the bicycle 10 can include other components as needed and/or desired.

Figure 2:
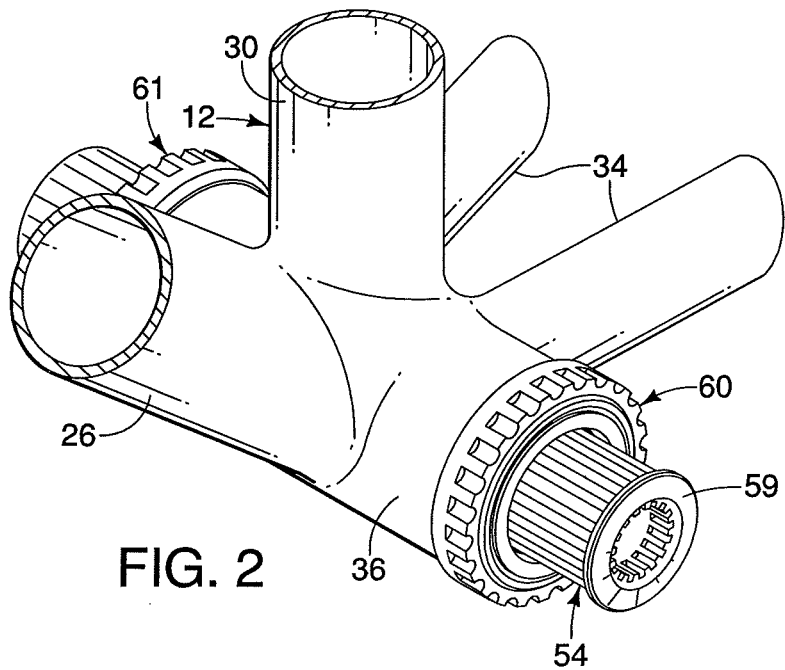
FIG. 2 is an enlarged, partial perspective view of the tubular hanger part of the bicycle frame illustrated FIG. 1 with the bicycle axle assembly installed in the tubular hanger part in accordance with the illustrated embodiment of the present invention.

As seen in FIGS. 1 and 2, the bicycle frame 12 is basically formed by a top tube 24, a down tube 26, a head tube 28, a seat tube 30, a pair of seat stays 32, a pair of chain stays 34 and a tubular hanger part 36. The top tube 24 is arranged generally horizontally, while the down tube 26 is arranged below the top tube 24 such that it slants obliquely upward toward the front. The head tube 28 joins the front ends of the top tube 24 and the down tube 26 together. The seat tube 30 extends diagonally upward and joins the rear ends of the top tube 24 and the down tube 26 together. The tubular hanger part 36 (shown in FIG. 2) forms a connection portion where the seat tube 30 and the down tube 26 are joined together.

The bicycle 10 is also provided with a seat post 38 has a saddle or seat 39 fastened thereto. The seat post 38 is secured in the seat tube 30 such that its position can be vertically adjusted up and down.

The drive unit 18 basically includes a front crankset 42, a rear gear cassette unit 43, a chain 44, a front derailleur 45, and a rear derailleur 46. The front crankset 42 is provided on the bottom bracket of the bicycle 10, which is at least partially formed by the tubular hanger part 36 as discussed above. The rear gear cassette unit 43 is mounted in a non-rotatable manner to the free hub of the rear wheel 22. The chain 44 is arranged on the front crankset 42 and the rear gear cassette unit 43 so as to span therebetween. The front derailleur 45 and the rear derailleur 46 function as gear changing devices.

As shown in FIGS. 1 and 2, the front crankset 41 basically includes a crank axle assembly 50, a right crank arm 51, a left crank arm 52, and a pair of pedals 53 (FIG. 1). The crank axle assembly 50 preferably has a crank axle 54 rotatably supported on the tubular hanger part 36 of the frame 12, a pair (left and right) of bearing adapters (e.g., the first and second axle support members) 60 and 61, a tube-shaped connecting member 62 and a pair (left and right) of cup/cone bearings 63 and 64.

The right crank arm 51 is preferably fixedly coupled to the right end of the crank axle 54 by an appropriate fixing method such as spline fastening, threadedly fastening, crimping, bonding or welding so that the right crank arm 51 is integrally coupled to the crank axle 54. The left crank arm 52 is removably fastened to the left end of the crank axle 54. The pedals 53 are mounted to the tip or free ends of the right and left crank arms 51 and 52.

Figure 3:
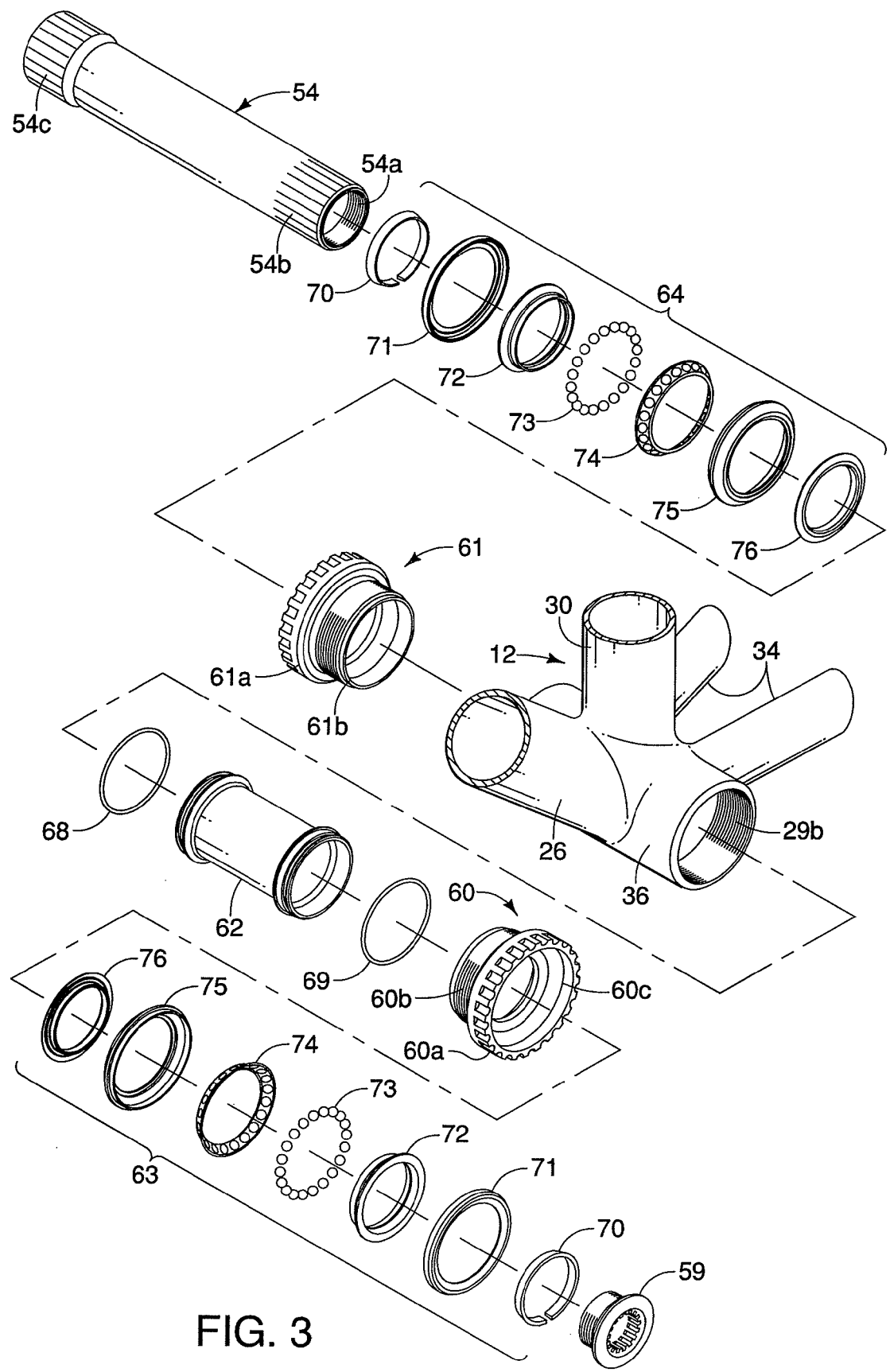
FIG. 3 is an exploded perspective view of the bicycle axle assembly with the parts of the bottom bracket exploded out of the tubular hanger part of the bicycle frame.
Figure 4:
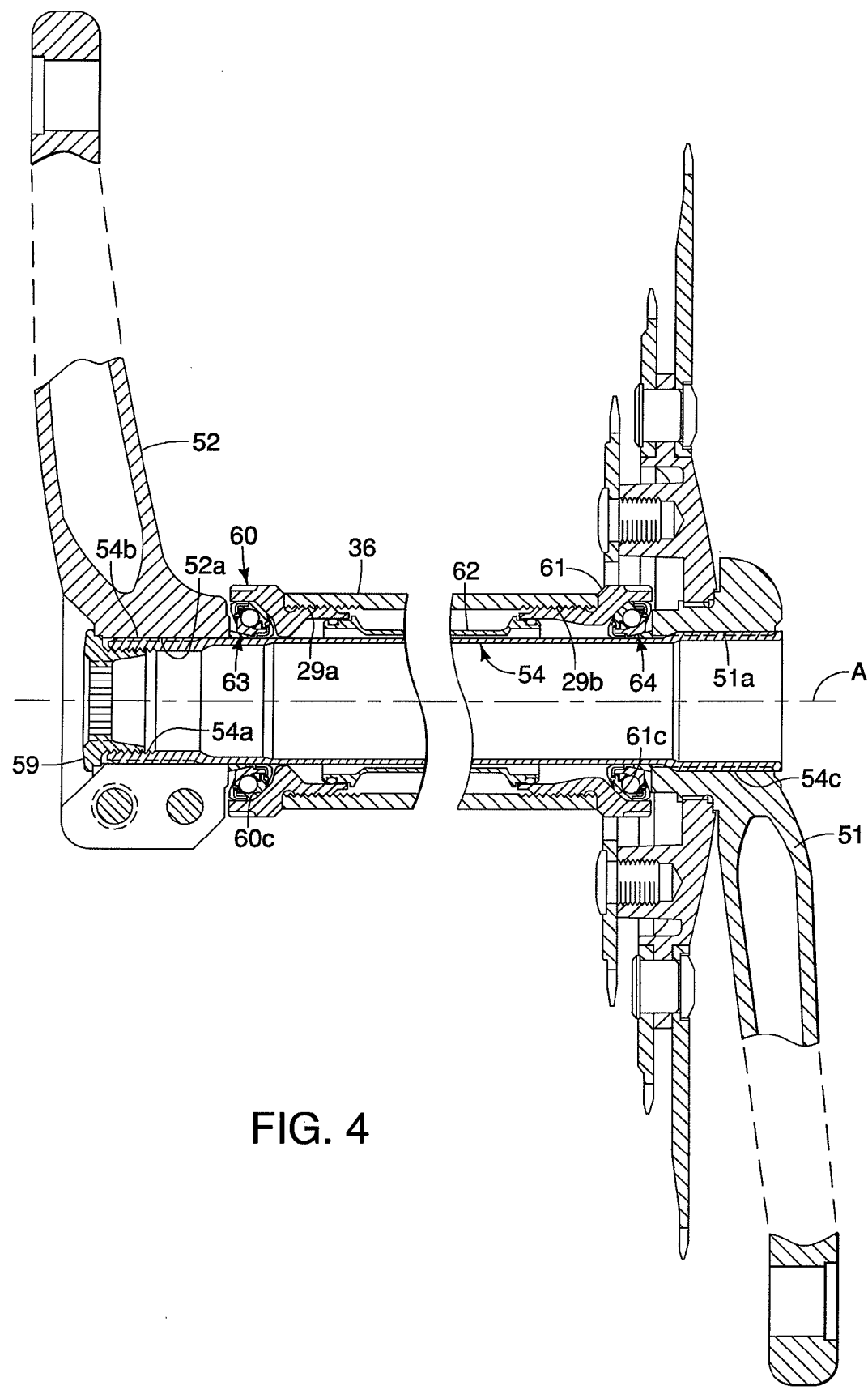
FIG. 4 is a transverse cross sectional view of the bicycle crank axle assembly in accordance with the illustrated embodiment of the present invention.

The crank axle 54 is preferably an alloy hollow pipe-shaped member that is highly rigid such as chrome molybdenum steel. As shown in FIGS. 3 and 4, the left end portion of the crank axle 54 includes a female (internal threads) thread 54a and a plurality of external splines or serrations 54b. The female (internal threads) thread 54a is disposed on an inner circumferential surface of the left end portion of the crank axle 54 so that a fastening bolt 59 is screwed into the female thread 54a to fasten the left crank arm 52. The serrations 54b is provided on the outer circumferential surface of the left end portion of the crank axle 54 to non-rotatably secure the left crank arm 52 thereon. As shown in FIGS. 3 and 4, the right end portion of the crank axle 54 includes a plurality of external splines or serrations 54c to non-rotatably secure the right crank arm 51. When the crank arms 51 and 52 are attached to the crank axle 54, the crank arms 51 and 52 apply a compression force to the cup/cone bearings 63 and 64 to properly load the cup/cone bearings 63 and 64.

The bearing adapters 60 and 61 are screwed in from both ends of the tubular hanger part 36. The tube-shaped connecting member 62 concentrically links the left and right bearing adapters 60 and 61. The left and right cup/cone bearings 63 and 64 are mounted on the left and right bearing adapters 60 and 61. In this embodiment, the left cup/cone bearing 63 constitutes a first bearing and the right cup/cone bearing 64 constitutes a second bearing.

Figure 7:
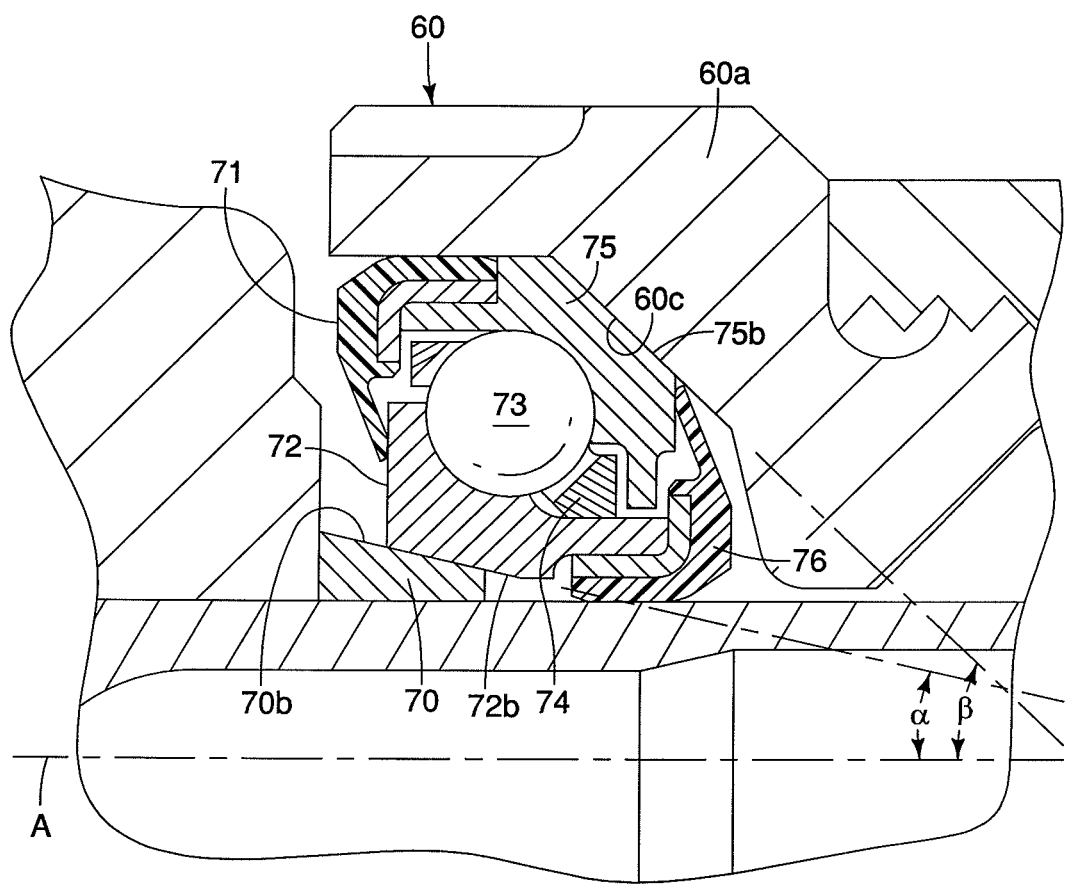
FIG. 7 is an enlarged, partial transverse cross sectional view of one of the bearings in accordance with the illustrated embodiment of the present invention.

The left and right bearing adapters 60 and 61 are identical, except that they are installed at opposite ends of the tubular hanger 36. In other words, the left and right bearing adapters 60 and 61 are mirror images of each other when installed at opposite ends of the tubular hanger 36. The bearing adapter 60 is a shoulder tube-shaped member that includes a bearing housing section or part 60a and a tubular mounting section or part 60b. The bearing adapter 61 is a shoulder tube-shaped member that includes a bearing housing section or part 61a and a tubular mounting section or part 61b. The cup/cone bearings 63 and 64 are retained and stored separately in the bearing housing sections 60a and 61a, respectively. The bearing housing section 60a has a tapered abutment 60c. Likewise, the bearing housing section 61a has a tapered abutment 61c. The tapered abutments 60c and 61c are angled relative to the rotational axis A at an abutment angle β (see FIG. 7). The abutment angle β is preferably between 40° and 50° with respect to the rotational axis A. More preferably, the abutment angle β is preferably 45° with respect to the rotational axis A as shown. The tapered abutments 60c and 61c contact a corresponding one of the cup/cone bearings 63 and 64 as explained below.

The left and right mounting sections 60b and 61b are fixedly mounted on the axial end portions of the tubular hanger part 36. The bearing housing sections 60a and 61a are disposed axially outwardly with respect to the mounting sections 60b and 61b and have a larger maximum diameter than the mounting sections 60b and 61b as seen in FIG. 4. Thus, the cup/cone bearings 63 and 64 can be larger than the inner diameter of the tubular hanger part 36. The tubular hanger part 36 includes the female threads 29a and 29b on the inner circumference on its both right and left edges, and the mounting sections 60b and 61b are externally threaded so that the mounting sections 60b and 61b are screwed with the female threads 29a and 29b, respectively. In order to prevent the screws from becoming loose by rotation of the cranks, the left female thread 29a is preferably a right-hand screw thread, and the right female thread 29b is preferably a left-hand screw thread. Therefore, the mounting section 60b that screws into the left female thread 29a is preferably a right-hand screw thread, and the mounting section 61b is preferably a left-hand screw thread.

The connecting part 62 is a tubular member that has an inside diameter that the crank axle 54 can penetrate therethrough. The connecting part 62 is coupled to inner edges of the mounting sections 60b and 61b of the left and right bearing adapters 60 and 61 at axial ends thereof. Two O rings 68 and 69 are preferably mounted on connecting parts of the connecting member 62 and the bearing adapters 60 and 61, respectively as seen in FIG. 4.

Figure 5:
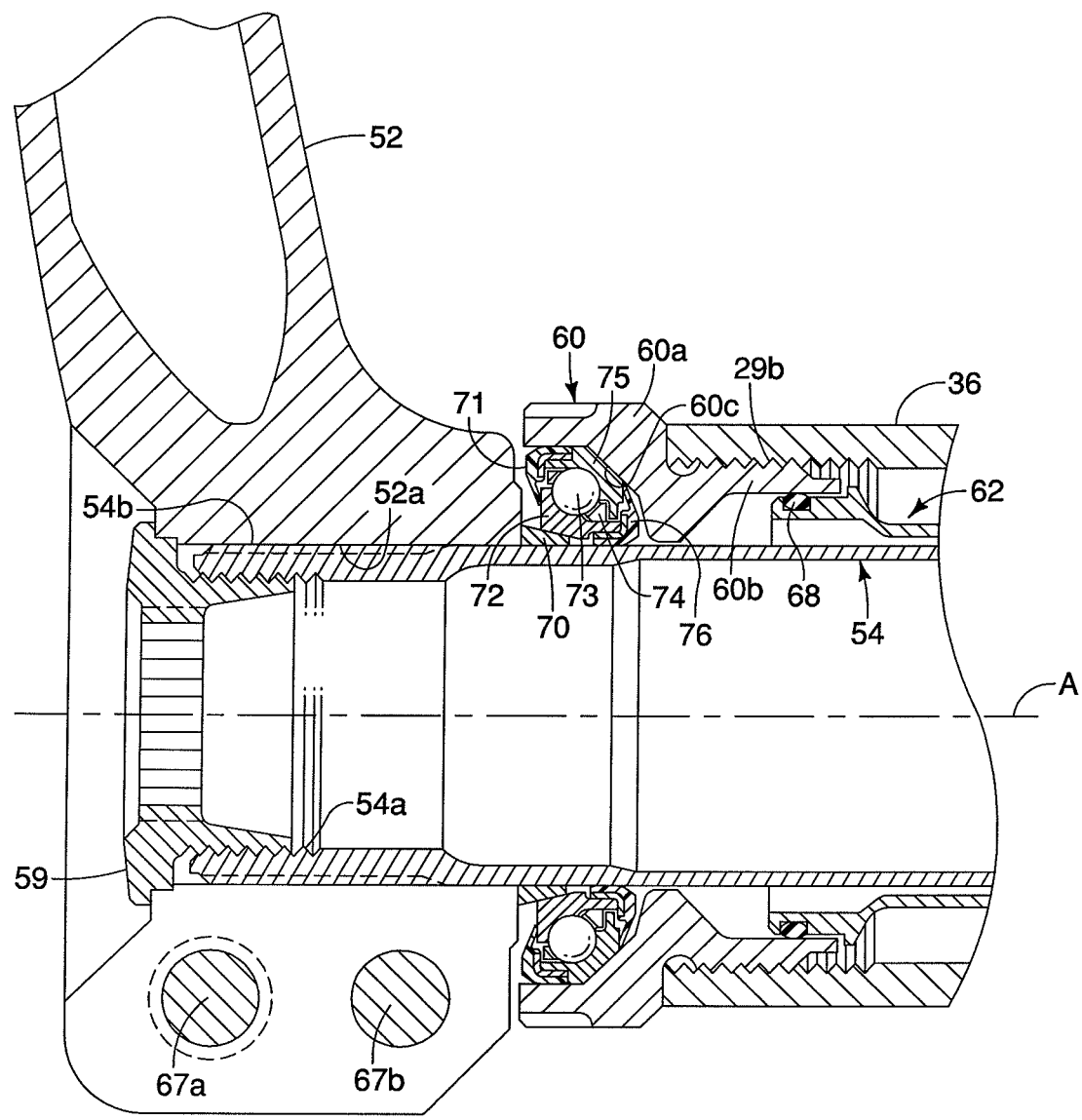
FIG. 5 is an enlarged, partial transverse cross sectional view of one end of the bicycle crank axle assembly in accordance with the illustrated embodiment of the present invention.
Figure 6:
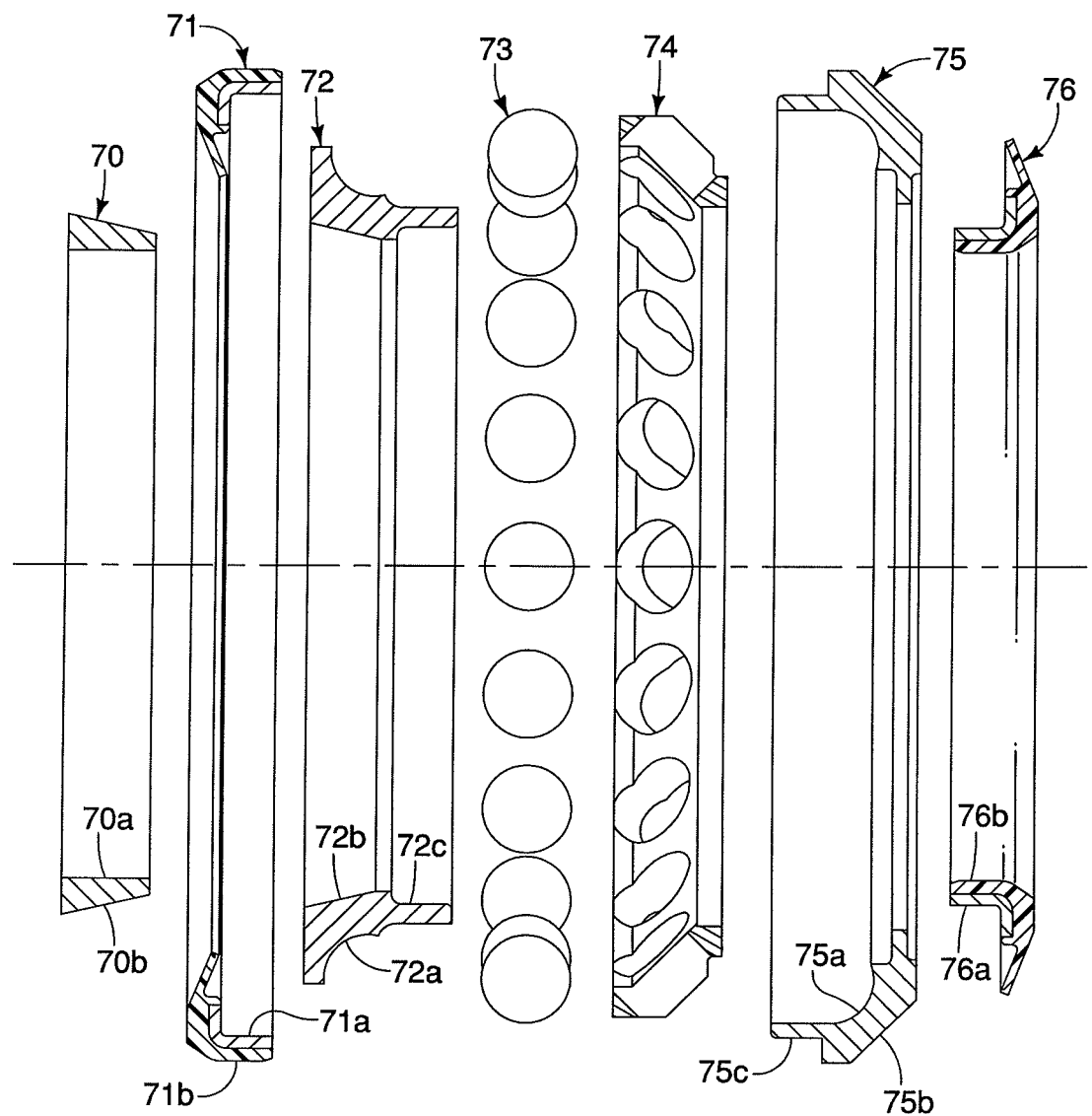
FIG. 6 is an exploded cross sectional view of the bicycle axle assembly in accordance with the illustrated embodiment of the present invention.

Referring to FIGS. 5 and 6, the cup/cone bearings 63 and 64 are identical, except that they are installed at opposite ends of the tubular hanger 36. In other words, the cup/cone bearings 63 and 64 are mirror images of each other when installed at opposite ends of the tubular hanger 36. Thus, identical reference numbers will be used for the cup/cone bearings 63 and 64. Each of the cup/cone bearings 63 and 64 preferably includes a conical element or spacer 70, an outer seal 71, an inner ring or cone 72, a plurality of ball bearings or roller elements 73, a ball bearing retainer 74, an outer ring or cup 75 and an inner seal 76.

The conical elements 70 are split rings that are disposed on the crank axle 54. Preferably, the conical elements 70 are constructed of a hard rigid material such as a metallic material. Each of the conical elements 70 has a cylindrical inner surface 70a and a conical outer surface 70b. The conical outer surfaces 70b of the conical elements 70 constitute tapered abutments that are angled relative to the rotational axis A at an abutment angle $\alpha$ (see FIG. 7). The abutment angle $\alpha$ is preferably between 7° and 17° with respect to the rotational axis A. More preferably, the abutment angle $\alpha$ is preferably 12° with respect to the rotational axis A as shown. The conical outer surfaces 70b (tapered abutments) contact a corresponding one of the cones 72 of the cup/cone bearings 63 and 64 as explained below.

The conical elements 70 are dimensioned to grip the crank axle 54 when pressed in an axial direction along the crank axle 54 against the cones 72. Thus, the conical elements 70 secure the cones 72 to the crank axle 54 and load the cup/cone bearings 63 and 64 when the crank arm 52 is mounted to the crank axle 54 and the cones 72 are squeezes towards each other by the crank arms 51 and 52. Each of the conical elements 70 has an outer end portion that extends outwardly in an axial direction along the crank axle 54 from an outer axially facing end of the cone 72 so that the crank arms 51 and 52 contact the conical elements 70 and not the cones 72.

The outer seals 71 are continuous ring members with a uniform cross sectional profile. The outer seals 71 are mounted on the cups 75 and contact the cones 72 to form an annular seal between the cups 75 and the cones 72. The outer seals 71 are preferably constructed of two pieces that include a rigid support portion 71a and a flexible sealing ring portion 71b coupled to the rigid support portion 71a. Preferably, the rigid support portion 71a is constructed of a hard rigid material such as a metallic material, while the flexible sealing ring portion 71b is constructed of a flexible material such as an elastomeric material or a flexible plastic material. The rigid support portion 71a has an L-shaped cross sectional profile with a cylindrical tube part extending in an axial direction with respect to the crank axle 54 and a radial flange part extending in a radial direction with respect to the crank axle 54.

The cones 72 are disposed on the crank axle 54 and secured to the crank axle 54 by the conical elements 70. The cones 72 are preferably one-piece, unitary members that are constructed of a hard rigid material such as a metallic material.

Each of the cones 72 has a curved bearing surface 72a facing outwardly in a generally radial direction with respect to the crank axle 54, and a tapered contact surface 72b facing inwardly in a generally radial direction with respect to the crank axle 54. The curved bearing surface 72a rotatably supports the roller elements 73. The tapered contact surface 72b is angled relative to the rotational axis A at an abutment angle $\alpha$. The abutment angle $\alpha$ is preferably between 7° and 17° with respect to the rotational axis A. More preferably, the abutment angle $\alpha$ is preferably 12° with respect to the rotational axis A as shown. The tapered contact surfaces 72b of the cones 72 contact the conical outer surfaces 70b (tapered abutments) of the conical elements 70.

Each of the cones 72 also includes an annular recess 72c for receiving a corresponding one of the inner seals 76. In other words, a portion of the inner seal 76 is disposed within the recess 72c. The recess 72c of the cone 72 is located on a surface of the cone 72 that faces the crank axle 54. The portion of the inner seal 76 that is disposed within the recess 72c contacts the crank axle 54.

In the illustrated embodiment, the roller elements 73 are ball bearings that are retained in the retainer 74. The roller elements 73 are disposed between the cone 72 and the cup 75 such that the cone 72 rotates relative to the cup 75 about the rotational axis A.

The cups 75 are preferably one-piece, unitary members that are constructed of a hard rigid material such as a metallic material. Each of the cups 75 has a curved bearing surface 75a facing inwardly in a generally radial direction with respect to the crank axle 54, and a tapered contact surface 75b facing outwardly in a generally radial direction with respect to the crank axle 54. The curved bearing surface 75a rotatably supports the roller elements 73. The tapered contact surface 75b is angled relative to the rotational axis A at an abutment angle $\beta$ (see FIG. 7). The abutment angle $\beta$ is preferably between 40° and 50° with respect to the rotational axis A. More preferably, the abutment angle $\beta$ is preferably 45° with respect to the rotational axis A as shown. The tapered contact surfaces 75b of each of the cups 75 contact a corresponding one of the tapered abutments 60c and 61c of the bearing adapters 60 and 61.

Each of the cups 75 also includes an annular recess 75c for receiving a corresponding one of the outer seals 71. In other words, a portion of the outer seal 71 is disposed within the recess 75c. The recess 75c of the cup 75 is located on a surface of the cup 75 that faces the bearing housing section 60a or 61a. The portion of the outer seal 71 that is disposed within the first recess 75c and contacts the first bearing housing section 60a or 61a.

During assembly of the crank axle assembly, the tapered contact surfaces 72b of the cones 72 are engaged by the conical outer surfaces 70b of the conical elements 70 such that the cones 72 forced towards each other by an axial abutment force from the crank arms 51 and 52. This wedging action (axially directed abutment force) of the conical elements 70 against the cones 72 results in the abutment force being transferred to the roller elements 73 which in turn is transferred to the cups 75 at about a forty-five degree angle with respect to the crank axle 54. Thus, the tapered contact surfaces 75b of the cups 75 press against the tapered abutments 60c and 61c of the bearing adapters 60 and 61 such that the cups 75 counteract the forces from the roller elements 73. Since the abutment angles $\beta$ between the conical elements 70 and the cones 72 are smaller than the abutment angles $\alpha$ between the cups 75 and the bearing adapters 60 and 61, it is possible to effectively eliminate backlash in the axial direction even if the axial abutment force is not very large. Also the first and second tapered abutments 60c and 61c of the bearing adapters 60 and 61 at least partially contact the tapered contact surfaces 75b at an area located radially outward relative to the tubular mounting sections 60b and 61b of the bearing adapters 60 and 61 as measured from the rotation axis A.

The inner seals 76 are continuous ring members with a uniform cross sectional profile. The inner seals 76 are mounted on the cones 72 and contact the crank axle 54 and the bearing adapters 60 and 61 to form an annular seal between the crank axle 54 and each of the bearing adapters 60 and 61. The inner seals 76 are preferably constructed of two pieces that include a rigid support portion 76a and a flexible sealing ring portion 76b coupled to the rigid support portion 76a. Preferably, the rigid support portion 76a is constructed of a hard rigid material such as a metallic material, while the flexible sealing ring portion 76b is constructed of a flexible material such as an elastomeric material or a flexible plastic material. The rigid support portion 76a has an L-shaped cross sectional profile with a cylindrical tube part extending in an axial direction with respect to the crank axle 54 and a radial flange part extending in a radial direction with respect to the crank axle 54.

Outward movement of the cones 72 in the axial direction is restricted by the conical elements 70 contacting the left and right crank arms 52 and 51, respectively. Also the inward movement of the cups 75 in the axial direction is restricted by the bearing adapters 60 and 61, respectively. Accordingly, with the arrangement of the crank axle assembly 50 as described above, the diameter of the cup/cone bearings 63 and 64 can be increased by placing the cup/cone bearings 63 and 64 on the outside of the tubular hanger part 36 in the axial direction.

As seen in FIG. 4, the right crank arm 51 is a gear crank that has three chain rings or sprockets mounted thereon in a removable manner by a crank connecting part. The right crank arm 51 includes a splined connecting hole 51a that is non-rotatably connected on the serrations 54c of the crank axle 54. The left crank arm 52 includes a splined connecting hole 52a that is non-rotatably connected on the serrations 54b of the crank axle 54. In particular, the connecting holes 51a and 52a has a plurality of splines or serrations so that the right and left crank arms 51 and 52 are non-rotatably coupled to the crank axle 54 at a certain rotational phase so that the crank arms 51 and 52 extend in opposite directions.

The left crank arm 52 is fixedly coupled to the crank axle 54 by the fastening bolt 59 that is screwed on the female thread 54a of the crank axle 54. The crank axle assembly 50 is configured and arranged such that the cup/cone bearings 63 and 64 are pressed with the left and right cranks 52 and 51 by screwing the fastening bolt 59. Accordingly, the bearing play of the cup/cone bearings 63 and 64 can be adjusted. A slit is formed on the connecting hole 52a of the left crank arm 52 that is mounted on the crank axle 54. The left crank arm 52 is strongly fixed on the crank axle 54 by tightening up two mounting bolts 67a and 67b that are located on the bottom of the crank axle 54 as seen in FIG. 2. Thus, the slit width of the slit 52d is narrowed by tightening the mounting bolts 67a and 67b that extend across the slit 52d to strongly fix the left crank arm 52 on the crank axle 54. These two mounting bolts 67a and 67b are, for example, hexagon socket head bolts, and their heads are preferably inserted from different directions.

When the crank axle assembly 50 of the present invention as described above is mounted on the tubular hanger part 36, first, the cup/cone bearings 63 and 64 are mounted on the left and right bearing adapters 60 and 61. In addition, the connecting member 62 is mounted on one of the bearing adapters 60 and 61.

In this state, the bearing adapters 60 and 61 are screwed to the female threads 29a and 29b of the tubular hanger part 36, respectively, with torque of a certain range. In particular, at this time, the bearing adapter 61 is screwed all the way with a certain range of torque so that the bearing housing section 61a is abut against an axial end surface of the tubular hanger part 36. The bearing adapter 60 is then screwed all the way with a certain range of torque on the tubular hanger part 36. Accordingly, the left bearing adapter 60 is retained and the axial position thereof with respect to the tubular hanger part 36 is fixed.

Next, the gear crank arm 51 to which the crank axle 54 is fixedly coupled is inserted from the side of the bearing adapter 61. The left crank arm 52 is mounted on an end of the crank axle 54 that projects axially outwardly from the left bearing adapter 60. The left crank arm 52 is mounted with a rotational phase orientation that is offset by 180 degrees from the right crank arm 51.

Then, the fastening bolt 59 is screwed to the female thread 54a of the crank axle 54, and the left crank 52 is fixed onto the crank axle 54. The crank axle 54 moves toward left in FIG. 4 by tightening up the fastening bolt 59, and the inner edge surfaces of the right and left cranks 51 and 52 place inward pressure on the conical elements 70, which transmits the inward pressure to the cones 72 of the cup/cone bearings 63 and 64. An adjustment to reduce misalignment between right and left of the crank axle 54 is performed by mounting the left crank 52 and adjusting the amount of pressure. When the adjustment of the bearing play is completed, the mounting bolts 67a and 67b of the left crank 52 are tightened up, and the left crank arm 52 is securely fixed onto the crank axle 54.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle crank axle assembly comprising:
  a crank axle including a first end portion having a plurality of external serrations provided on an outer circumferential surface of the first end portion of the crank axle, and an internal thread disposed on an inner circumferential surface of the first end portion of the crank axle, the crank axle defining a rotational axis;

a first crank arm including a splined connecting hole non-rotatably engaged with the external serrations of the first end portion of the crank axle, the first crank arm being secured to the first end portion of the crank axle by a fastening bolt screwed in an axial direction into the internal thread of the first end portion of the crank axle;

a first bearing including a first cone, a first cup, and a plurality of first roller elements, the first cone being disposed on the crank axle and the plurality of first roller elements being disposed between the first cone and the first cup such that the first cup rotates relative to the first cone about the rotational axis, the first cone contacting the roller elements along an entirety of an arc extending ninety degrees from a radially innermost point of the roller elements with respect to the rotational axis, and the first cup contacting the roller elements along an entirety of an arc extending ninety degrees from an axially innermost point of the roller elements with respect to the rotational axis;

a first bearing adapter including a first tubular mounting section for mounting to a tubular member and a first bearing housing section housing the first bearing therein, the first bearing housing section having a first tapered abutment angled relative to the rotational axis at a first abutment angle that corresponds to an acute angle formed by an intersection between the rotational axis and an extension plane of the first tapered abutment and contacting a first tapered contact surface of the first cup; and a first conical element disposed on the crank axle, the first conical element having a tapered abutment surface angled relative to the rotational axis at a second abutment angle that corresponds to an acute angle formed by an intersection between the rotational axis and an extension plane of the tapered abutment surface of the first conical element and contacting a first tapered contact surface of the first cone, the first bearing being axially pressed by the crank arm axially moving the first conical element in response to the fastening bolt being screwed into the internal thread of the crank axle, the second abutment angle of the tapered abutment surface of the first conical element being smaller than the first abutment angle of the first bearing housing section, and the tapered abutment surface of the first conical element having a tapered outer end portion that extends outwardly in the axial direction along the crank axle from a first outer axially facing end of the first cone.

2. The bicycle crank axle assembly according to claim 1, wherein
the first tapered abutment of the first bearing housing section at least partially contacts the first tapered contact surface of the first cup at an area radially outwardly relative to the first tubular mounting section as measured from the rotational axis.

3. The bicycle crank axle assembly according to claim 2, wherein
the area at which the first tapered abutment of the first bearing housing section at least partially contacts the first tapered contact surface of the first cup is located radially outward of an annular outer face of the first tubular mounting section as measured from the rotational axis.

4. The bicycle crank axle assembly according to claim 1, further comprising a second bearing including a second cone, a second cup, and a plurality of second roller elements, the second cone being disposed on the crank axle and the plurality of second roller elements being disposed between the second cup and the second cone such that the second cup rotates relative to the second cone about the rotational axis; and a second bearing adapter including a second tubular mounting section for mounting to the tubular member and a second bearing housing section housing the second bearing therein, the second bearing housing section having a second tapered abutment angled relative to the rotational axis at a third abutment angle that corresponds to an acute angle formed by an intersection between the rotational axis and an extension plane of the second tapered abutment and contacting a second tapered contact surface of the second cup.

5. The bicycle crank axle assembly according to claim 4, further comprising
a second conical element disposed on the crank axle, the second conical element having a tapered abutment surface angled relative to the rotational axis at a fourth abutment angle that corresponds to an acute angle formed by an intersection between the rotational axis and an extension plane of the tapered abutment surface of the second conical element and contacting a second tapered contact surface of the second cone, and the fourth abutment angle of the tapered abutment surface of the second conical element being smaller than the third abutment angle of the second bearing housing section.

6. The bicycle crank axle assembly according to claim 5, wherein
the tapered abutment surface of the second conical element has a tapered outer end portion that extends outwardly in an axial direction along the crank axle from a second outer axially facing end of the second cone.

7. The bicycle crank axle assembly according to claim 4, wherein
the second tapered abutment of the second bearing housing section at least partially contacts the second tapered contact surface of the second cup at an area radially outwardly relative to the second tubular mounting section as measured from the rotational axis.

8. The bicycle crank axle assembly according to claim 7, wherein
the area at which the second tapered abutment of the second bearing housing section at least partially contacts the second tapered contact surface of the second cup is located radially outward of an annular outer face of the second tubular mounting section as measured from the rotational axis.

9. The bicycle crank axle assembly according to claim 4, wherein
the first and second bearings are mirror images of each other.

10. The bicycle crank axle assembly according to claim 1, wherein
the first conical element does not contact the first outer axially facing end of the first cone.

11. The bicycle crank axle assembly according to claim 1, wherein
the first crank arm directly abuts the first conical element.

* * * * *